United States Patent
Bocking et al.

(10) Patent No.: US 7,962,136 B2
(45) Date of Patent: Jun. 14, 2011

(54) HANDHELD ELECTRONIC DEVICE INCLUDING PREFERRED NETWORK SELECTION, AND ASSOCIATED METHOD

(75) Inventors: Andrew D. Bocking, Waterloo (CA); Margarita Datsen, Vaughan (CA); Darcy Phipps, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1659 days.

(21) Appl. No.: 10/941,487

(22) Filed: Sep. 15, 2004

(65) Prior Publication Data

US 2006/0075090 A1     Apr. 6, 2006

(51) Int. Cl.
*H04W 4/00*     (2009.01)
(52) U.S. Cl. .................. 455/432.1; 455/450; 455/550.1; 455/552.1; 455/436; 455/437
(58) Field of Classification Search .............. 455/435.3, 455/432.3, 433.2, 448, 551, 432.1, 450, 550.1, 455/552.1, 436, 437
See application file for complete search history.

(56) References Cited

U.S. PATENT DOCUMENTS

| | | | | |
|---|---|---|---|---|
| 5,903,832 A | * | 5/1999 | Seppanen et al. | 455/435.3 |
| 5,999,811 A | * | 12/1999 | Molne | 455/432.3 |
| 6,405,040 B1 | * | 6/2002 | Liu et al. | 455/435.3 |
| 6,625,451 B1 | * | 9/2003 | La Medica et al. | 455/434 |
| 2002/0118664 A1 | * | 8/2002 | Ishibashi et al. | 370/338 |
| 2002/0147012 A1 | | 10/2002 | Leung et al. | |
| 2003/0134637 A1 | | 7/2003 | Cooper | |
| 2005/0238046 A1 | * | 10/2005 | Hassan et al. | 370/465 |
| 2006/0172737 A1 | * | 8/2006 | Hind et al. | 455/435.2 |

FOREIGN PATENT DOCUMENTS

| | | |
|---|---|---|
| EP | 0 781 064 A2 | 6/1997 |
| GB | 2 395 867 A | 6/2004 |
| WO | WO 95/33329 | 12/1995 |

OTHER PUBLICATIONS

3GPP TS 22.011, 3rd Generation Partnership Project; Technical Specification Group Services and System Aspects; Service accessibility (Release 7).
3GPP TS 23.122 V6.1.0 (Jun. 2004) 3rd Generation Partnership Project; Technical Specification Group Core Network; NAS Functions related to Mobile Station (MS) in idle mode (Release 6).

* cited by examiner

*Primary Examiner* — Ajit Patel
*Assistant Examiner* — Khai M Nguyen
(74) *Attorney, Agent, or Firm* — Gowling Lafleur Henderson LLP (57) ABSTRACT

A handheld electronic device adapted to display a listing of known networks, scan for available networks, display a listing of the available networks and enable the entry of information relating to manually entered networks. In addition, the device is adapted to (1) enable the addition of preferred networks to a preferred network list wherein the preferred networks are one or more of: (i) certain of the known networks selected from the listing of known networks, (ii) certain of the available networks selected from the listing of available networks, and (iii) the manually entered networks; (2) enable the assignment of a priority value to each of the preferred networks; and (3) utilize the preferred networks for performing wireless communications when the device is in a roaming situation, wherein the preferred networks are utilized in a priority order that is based on the priority value assigned to each of the preferred networks.

19 Claims, 7 Drawing Sheets

HANDHELD ELECTRONIC DEVICE INCLUDING PREFERRED NETWORK SELECTION, AND ASSOCIATED METHOD

BACKGROUND OF THE INVENTION

1. Field of the Invention

The invention relates generally to handheld electronic devices and, more particularly, to a handheld electronic device that enables a user to establish a prioritized list of preferred networks to be used in roaming situations. The invention also relates to an improved method of establishing a prioritized list of preferred networks to be used by a handheld electronic device in roaming situations.

2. Description of the Related Art

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are relatively small.

Many handheld electronic devices include and provide access to a wide range of integrated applications, including, without limitation, email, telephone, short message service (SMS), multimedia messaging service (MMS), browser, calendar and address book applications, such that a user can easily manage information and communications from a single, integrated device. These applications are typically selectively accessible and executable through a user interface that allows a user to easily navigate among and within these applications.

Many handheld electronic devices include wireless telephone and data (e.g., email, SMS, Internet) functionality. As is known in the art, wireless services, such as telephone and data services, are provided by way of an air interface involving radio frequency (RF) communications between wireless enabled equipment, such as a handheld electronic device described above, and one or more networks of land based radio transmitters or base stations. Each such network is commonly referred to as a public land mobile network (PLMN). PLMNs interconnect with other PLMNs and the public switched telephone network (PSTN) for telephone communications or with Internet service providers for data and Internet access.

In order to use wireless communications functionality, a user must subscribe with a wireless service provider or operator. The subscription permits the user to utilize the PLMN operated by the service provider or operator (referred to as the "home PLMN"). As is known in the art, roaming is a service offered by PLMN operators which allows a subscriber to use his or her wireless enabled equipment while in the service area of another operator (and outside of the user's home PLMN). Roaming requires an agreement between operators of technologically compatible systems to permit customers of either operator to access the other's PLMN. Service providers or operators typically charge a higher per-minute fee for calls placed outside their home calling or coverage area (the area serviced by their PLMN).

As is also known in the art, devices, such as handheld electronic devices, that include wireless functionality, such as telephone and data functionality, are provided with a subscriber identity module card (SIM card). A SIM card is a small printed circuit board that contains subscriber details, including data that identifies the user to the service provider, security information, and memory for a personal directory of numbers. In addition, the SIM card stores a pre-set, prioritized list of particular PLMNs to be used by the device in roaming situations. The particular PLMNs included in the list are normally based on the marketing preferences of a particular operator. However, as will be appreciated, different PLMNs have differing charges associated with them and offer different levels of reliability and service quality. Thus, a user may desire to use PLMNs other than those pre-stored in the SIM card and/or use PLMNs in a different order of priority than that specified in the SIM card based on issues of cost, reliability, and service quality, among others. Thus, there is a need for an improved handheld electronic device that enables a user to establish a prioritized list of preferred PLMNs to be used in roaming situations.

SUMMARY OF THE INVENTION

An improved handheld electronic device and an associated method enable a user to selectively establish a prioritized list of preferred PLMNs to be used in roaming situations. As a result, a user is able to select particular PLMNs based on issues of PLMN cost, reliability, and service quality, among others.

These and other aspects of the invention are provided by a wirelessly enabled handheld electronic device including an input apparatus, a communications subsystem, a display, a processor, and a memory storing one or more applications executable by the processor. The one or more applications are adapted to display a listing of one or more known networks for which network information is stored in the memory, scan for one or more available networks, which are networks available for use in conducting wireless communications in the area in which the handheld electronic device is currently located, and display a listing of the available networks. The applications are also adapted to enable the entry of information relating to one or more manually entered networks. Furthermore, the applications are adapted to (1) enable the addition of one or more preferred networks to a preferred network list wherein the preferred networks are one or more of: (i) certain of the known networks selected from the listing of known networks, (ii) certain of the available networks selected from the listing of available networks, and (iii) the manually entered networks; (2) enable the assignment of a priority value to each of the preferred networks; and (3) utilize one or more of the preferred networks for performing wireless communications when the handheld electronic device is in a roaming situation, wherein the preferred networks are utilized in a priority order that is based on the priority value assigned to each of the preferred networks.

The communications subsystem may include a SIM card, wherein the applications are further adapted to store the preferred network list in the SIM card. The preferred network list also preferably includes network information for each of said preferred networks, such as the MNC and MCC for each of the preferred networks. The handheld electronic device may also include a thumbwheel that may be used to scroll up and down for data selection purposes.

Preferably, the preferred network list is displayed in a display order corresponding to the priority order. In one case, the priority value of a first one of the preferred networks is a highest priority, and the priority value of a second one of the preferred networks is a lowest priority, and the priority order is sequential beginning with the first one of the preferred networks and ending with the second one of the preferred networks. The applications may be further adapted to enable the movement of a selected one of the preferred networks on the display to create an altered display order, wherein the priority value assigned to one or more of the preferred networks is changed such that the priority order corresponds to the altered display order. In addition, the one or more applications may be further adapted to enable the deletion of a selected one of the preferred networks on the display to create an altered display order, wherein the priority value assigned to one or more of the preferred networks is changed such that the priority order corresponds to the altered display order.

According to another aspect of the invention, a method of establishing a prioritized list of networks to be used by a handheld electronic device in roaming situations is provided. The method includes displaying a listing of one or more known networks upon request of a user of the handheld electronic device, with each of the known networks having network information stored by the handheld electronic device, scanning for one or more available networks upon request of the user, with each of the available networks being available for use in conducting wireless communications in an area in which the handheld electronic device is currently located, and displaying a listing of the available networks. The method further includes receiving information relating to one or more manually entered networks when input into the handheld electronic device by the user. Finally, the method includes adding one or more preferred networks to a preferred network list, the preferred networks being one or more of: (i) certain of the known networks selected from the listing of known networks, (ii) certain of the available networks selected from the listing of available networks, and (iii) the manually entered networks, and assigning a priority value to each of the preferred networks, wherein one or more of the preferred networks are utilized for performing wireless communications when the handheld electronic device is in a roaming situation in a priority order that is based on the priority value assigned to each of the preferred networks.

BRIEF DESCRIPTION OF THE DRAWINGS

A full understanding of the invention can be gained from the following Description of the Preferred Embodiment when read in conjunction with the accompanying drawings in which.

Similar numerals refer to similar parts throughout the specification.

DESCRIPTION OF THE PREFERRED EMBODIMENT

Figures 1, 2:
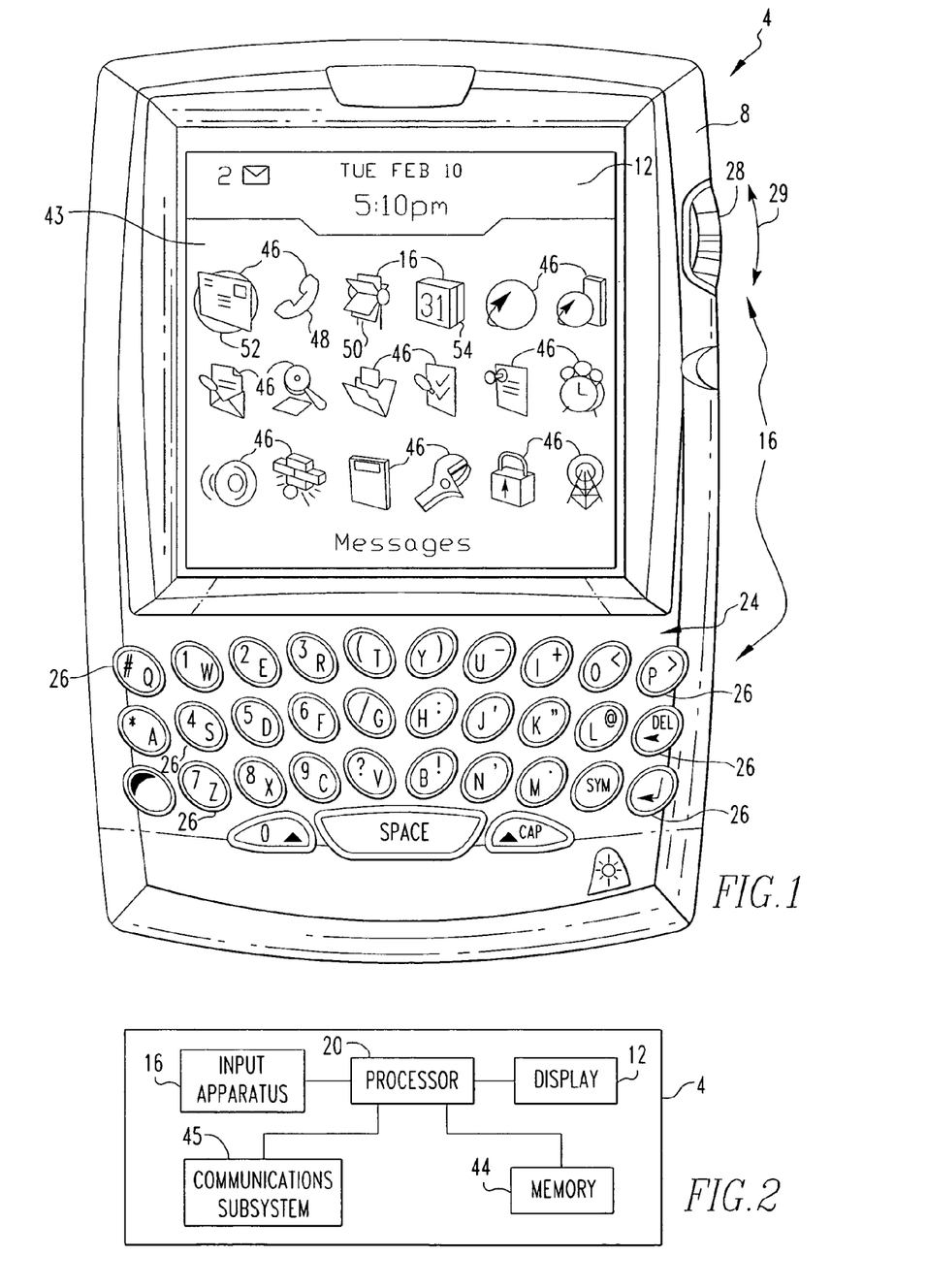
FIG. 1 is a front view of an improved handheld electronic device in accordance with the invention.
FIG. 2 is a block diagram of the handheld electronic device of FIG. 1.

An improved handheld electronic device 4 in accordance with the invention is depicted generally in FIGS. 1 and 2. The handheld electronic device 4 includes a housing 8, a display 12, an input apparatus 16, and a processor 20 (FIG. 2) which may be, without limitation, a microprocessor (μP). The processor 20 is responsive to inputs received from the input apparatus 16 and provides outputs to the display 12. While for clarity of disclosure reference has been made herein to the exemplary display 12 for displaying various types of information, it will be appreciated that such information may be stored, printed on hard copy, be computer modified, or be combined with other data, and all such processing shall be deemed to fall within the terms "display" or "displaying" as employed herein. Examples of handheld electronic devices are included in U.S. Pat. Nos. 6,452,588 and 6,489,950, which are incorporated by reference herein. The handheld electronic device 4 is of a type that includes a wireless telephone capability which, as will be described in greater detail below, enables a user to selectively establish a prioritized list of preferred PLMNs to be used in roaming situations in accordance with the invention. As used herein, the terms "phone" and "telephone" shall refer to any type of voice communication initiated and conducted over a wired and/or wireless network.

As can be understood from FIG. 1, the input apparatus 16 includes a keyboard 24 having a plurality of keys 26, and a rotatable thumbwheel 28. As used herein, the expression "key" and variations thereof shall refer broadly to any of a variety of input members such as buttons, switches, and the like without limitation. The keys 26 and the rotatable thumbwheel 28 are input members of the input apparatus 16, and each of the input members has a function assigned thereto. As used herein, the expression "function" and variations thereof can refer to any type of process, task, procedure, routine, subroutine, function call, or other type of software or firmware operation that can be performed by the processor 20 of the handheld electronic device 4.

As is shown in FIG. 2, the processor 20 is in electronic communication with memory 44. Memory 44 can be any of a variety of types of internal and/or external storage media such as, without limitation, RAM, ROM, EPROM(s), EEPROM (s), and the like, that provide a storage register for data storage such as in the fashion of an internal storage area of a computer, and can be volatile memory or nonvolatile memory. The memory 44 further includes a number of applications executable by processor 20 for the processing of data. The applications can be in any of a variety of forms such as, without limitation, software, firmware, and the like, and the term "application" herein shall include one or more routines, subroutines, function calls or the like, alone or in combination.

As is also shown in FIG. 2, processor 20 is in electronic communication with communications subsystem 45. Communications functions for handheld electronic device 4, including data and voice communications (wireless telephone), are performed through communications subsystem 45. Communications subsystem 45 includes a transmitter and a receiver (possibly combined in a single transceiver component), a SIM card, and one or more antennas. Other known components, such as a digital signal processor and a local oscillator, may also be part of communications subsystem 45. The specific design and implementation of communications subsystem 45 is dependent upon the communications network in which handheld electronic device 4 is intended to operate. For example, handheld electronic device 4 may include a communications subsystem 45 designed to operate with the Mobiltex™, DataTAC™ or General Packet Radio Service (GPRS) mobile data communication networks and also designed to operate with any of a variety of voice communications networks, such as AMPS, TDMA, CDMA, PCS, GSM, and other suitable networks. Other types of data and voice networks, both separate and integrated, may also be utilized with handheld electronic device 4. Together, processor 20, memory 44, and communications subsystem 45 may, along with other components (having various types of functionality), be referred to as a processing unit.

In FIG. 1, the display 12 is depicted as displaying a home screen 43 that includes a number of applications depicted as discrete icons 46, including, without limitation, an icon representing a phone application 48, an address book application 50, a messaging application 52 which includes email, SMS and MMS applications, and a calendar application 54. In FIG. 1, the home screen 43 is currently active and would constitute a portion of an application. Other applications, such as phone application 48, address book application 50, messaging application 52, and calendar application 54 can be initiated from the home screen 43 by providing an input through the input apparatus 16, such as by rotating the thumbwheel 28 and providing a selection input by translating the thumbwheel 28 in the direction indicated by the arrow 29 in FIG. 1.

FIGS. 3 through 17 are exemplary depictions of display 12 of handheld electronic device 4 that illustrate a routine or routines performed by processor 20 for enabling a user to selectively establish a prioritized list of preferred PLMNs to be used in roaming situations according to the invention. By utilizing the invention, a user of handheld electronic device 4 is able to override the list of particular PLMNs to be used by the handheld electronic device 4 in roaming situations that is pre-stored in the SIM card forming a part of communications subsystem 45 by establishing and storing a user selected and prioritized list of PLMNs to be used by the handheld electronic device 4 in roaming situations. In the particular embodiment shown in FIGS. 3 through 17, this list is called the "My Preferred Network List."

Figure 3:
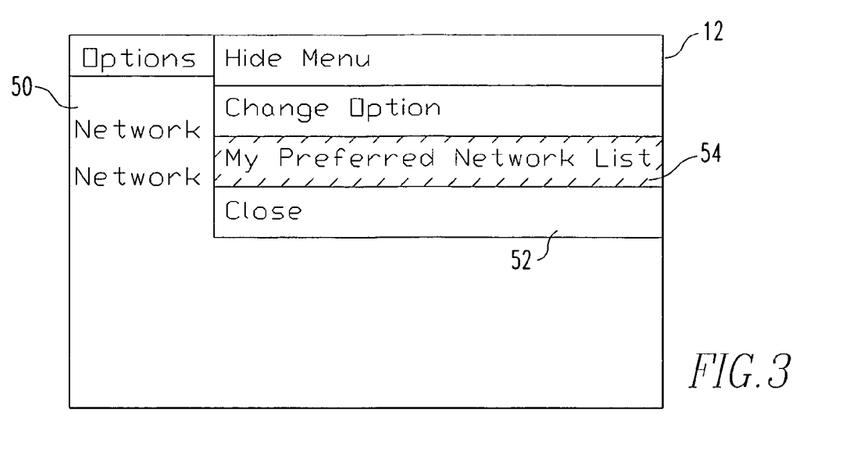
FIGS. 3 through 20 are exemplary views of a portion of the display of the handheld electronic device of FIGS. 1 and 2 that illustrate a routine or routines for enabling a user to selectively establish a prioritized list of preferred PLMNs to be used in roaming situations according to the invention.
Figure 4:
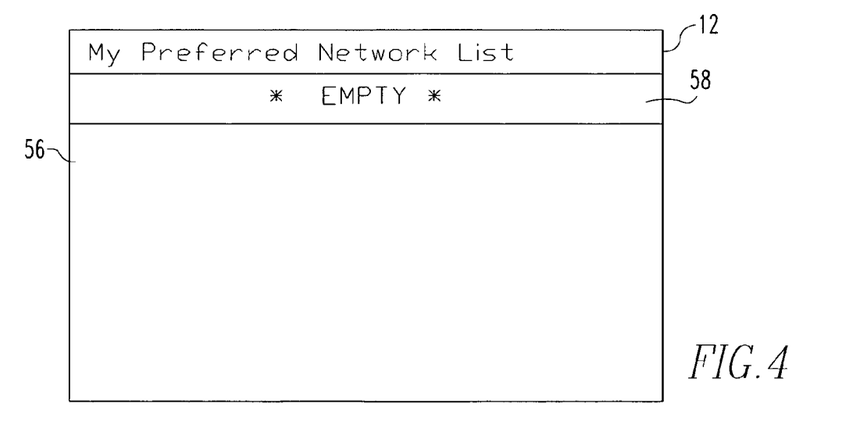
Figure 5:
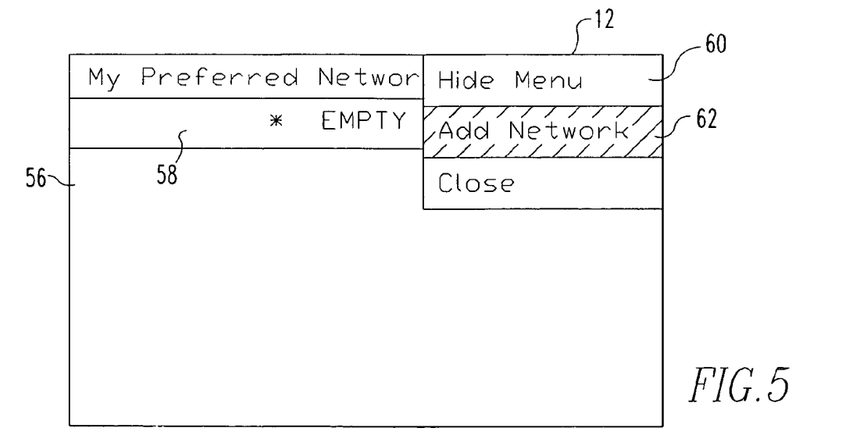
Figure 6:
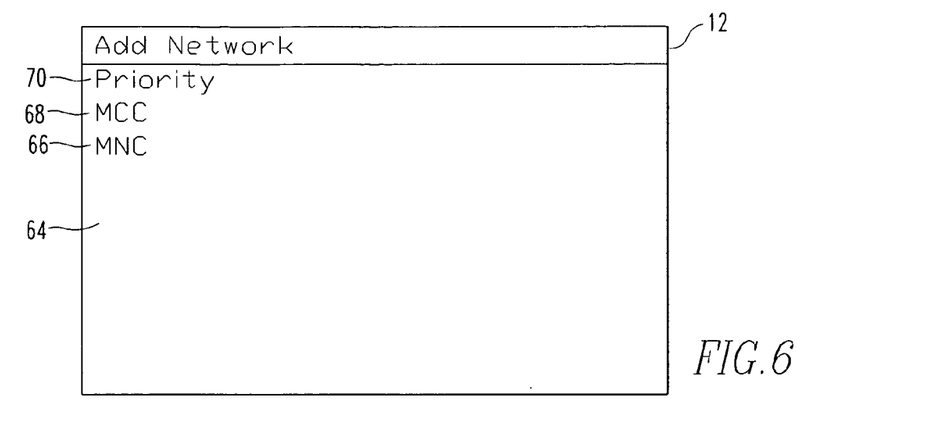
Figure 7:
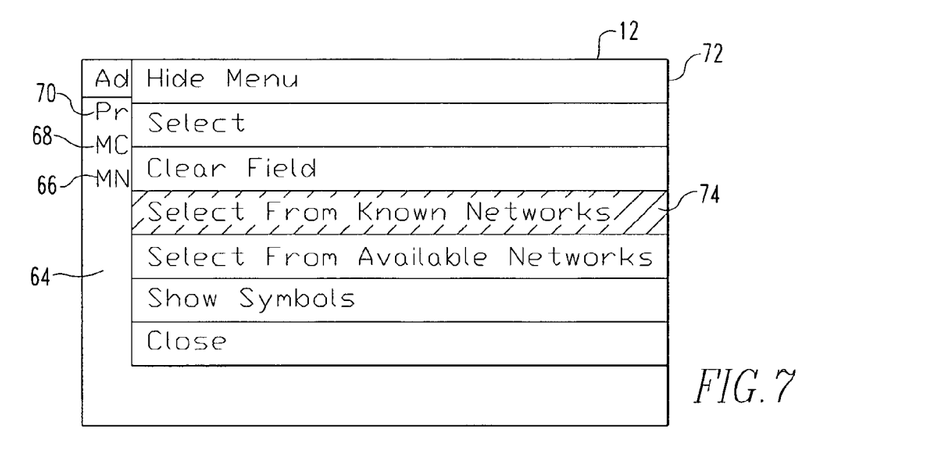

FIG. 3 is an exemplary depiction of display 12 showing an "Options-Network" screen 50 generated by an operating application of handheld electronic device 4 which provides a user with information and options relating to the PLMNs used or to be used by handheld electronic device 4. As seen in FIG. 3, menu 52 may be accessed from "Options-Network" screen 50 in a known manner using input apparatus 16. Menu 52 includes an item 54 entitled "My Preferred Network List." When a user desires to create a prioritized list of PLMNs to be used by handheld electronic device 4 in roaming situations according to the invention, the user first selects item 54. When a user does so, a "Preferred Network List" screen 56 as shown in FIG. 4 is displayed on display 12. "Preferred Network List" screen 56 displays a prioritized listing 58 of PLMNs selected by the user as described herein to be used by handheld electronic device 4 in roaming situations. As seen in FIG. 4, the listing 58 is initially empty. To add a PLMN to the listing 58, the user accesses menu 60 in a known manner and selects item 62 entitled "Add Network." Next, as seen in FIG. 6, "Add Network" screen 64 is displayed to the user on display 12. At this point, the user has three options to choose from for adding a PLMN to the listing 58. Each option is described below.

In the first option, a user can manually add a PLMN to the listing 58 by entering identifying information for the PLMN into the data fields provided on "Add Network" screen 64 using input apparatus 16. In particular, to add a particular PLMN to the listing 58, the user must enter the mobile network code (MNC) for the PLMN at field 66, the mobile country code (MCC) for the PLMN at field 68, and the priority the user wishes to assign to that PLMN at field 70. The respective priorities assigned to the PLMNs listed on listing 58 determines the order in which the PLMNs are to be used by handheld electronic device 4, if available, in roaming situations.

Figure 8:
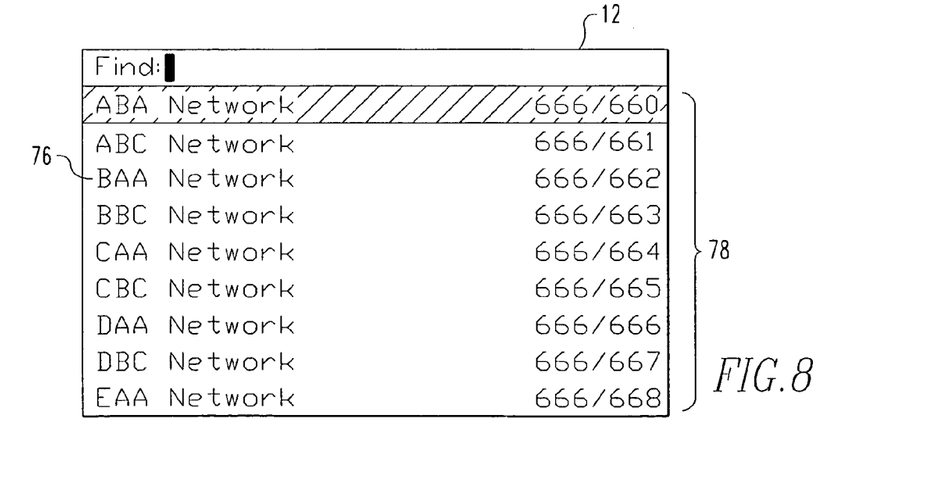
Figure 9:
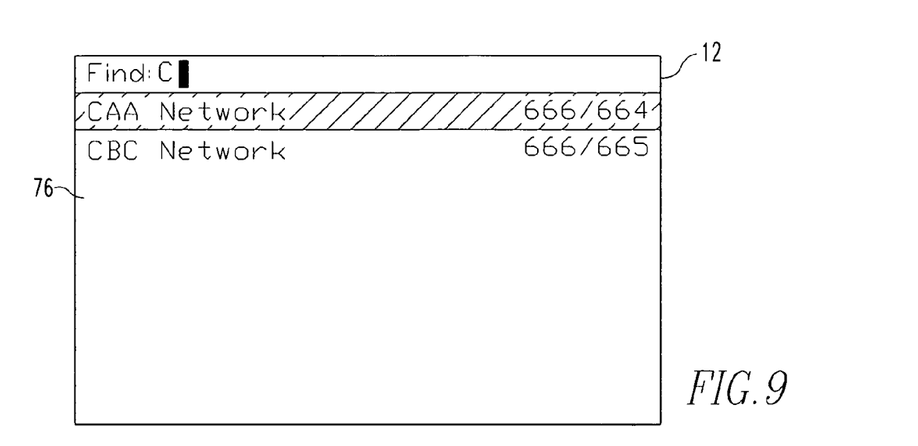
Figure 10:
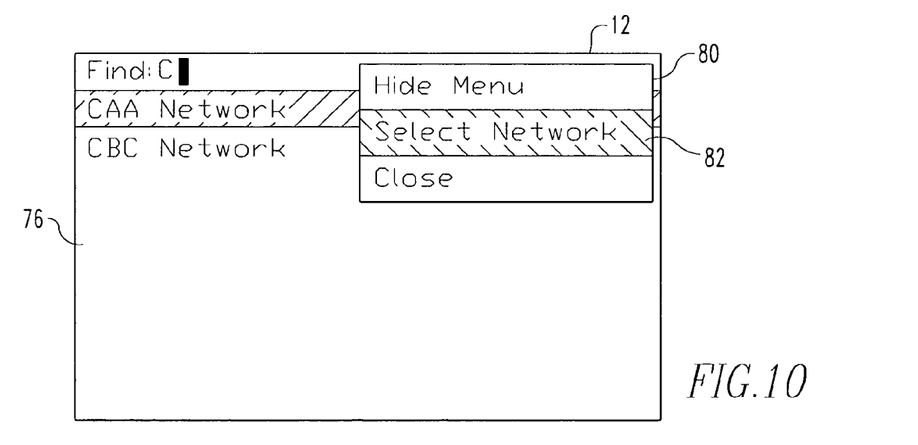
Figure 11:
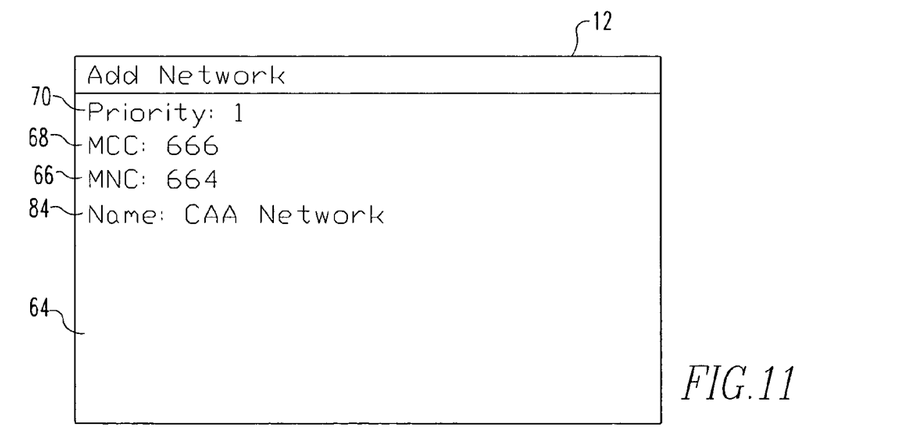
Figure 12:
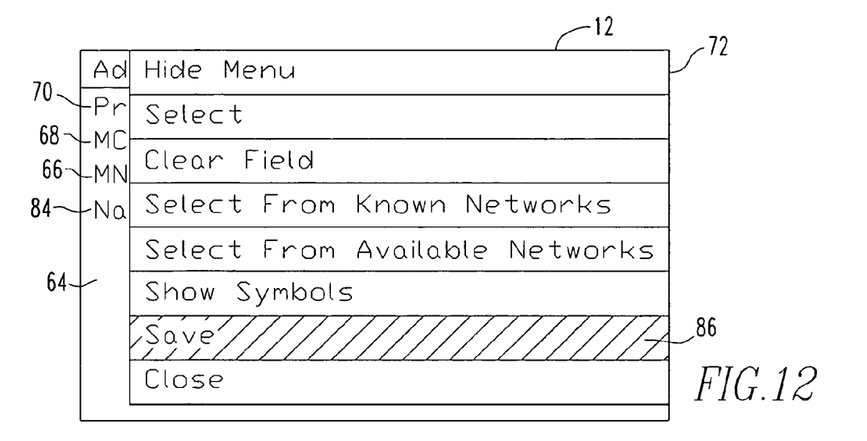
Figure 13:
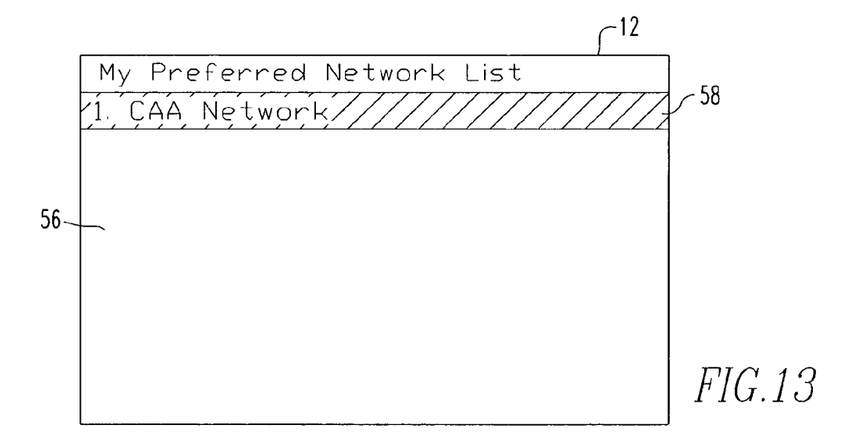
Figure 14:
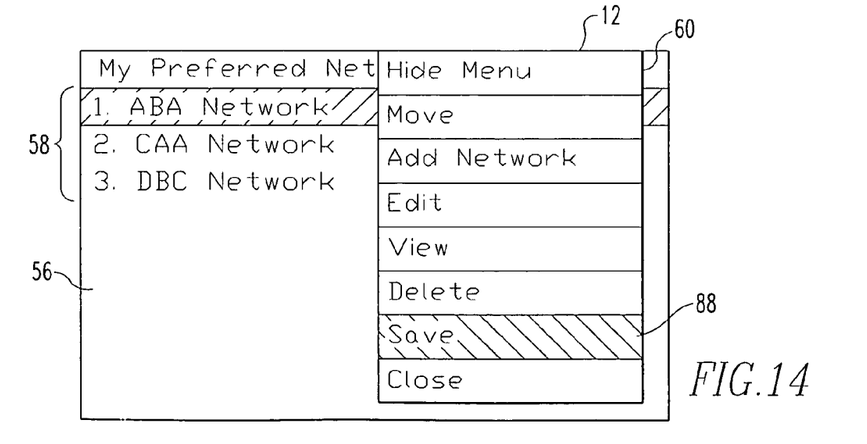

In the second option, the user can add a PLMN to the listing 58 by selecting the PLMN from a group of "known networks" stored in memory 44 of handheld electronic device 4 (the MNC and MCC is stored for each such "known network"). To do so, the user accesses menu 72 in a known manner and selects item 74 entitled "Select From Known Networks." Next, as seen in FIG. 8, "Find" screen 76 is displayed on display 12. "Find" screen 76 includes a listing 78 of all of the "known networks" stored by memory 44 of handheld electronic device 4. A user may then identify for selection a particular PLMN from listing 78 by scrolling down listing 78 in a known manner using input apparatus 16 or by typing a portion of or all of the name of the PLMN using input apparatus 16 as shown in FIG. 9. Once a particular PLMN has been identified, a user may then select the PLMN for inclusion in the listing 58 by accessing menu 80 in a known manner and selecting item 82 entitled "Select Network" as shown in FIG. 10. When this is done, "Add Network" screen 64 is displayed on display 12 as shown in FIG. 11, and information for the PLMN is automatically provided in fields 66 (MNC) and 68 (MCC), as well as field 84, which is the name of the PLMN. The user must then enter information into field 70 using input apparatus 16 to establish the priority to be assigned to the PLMN. Once all of the information has been entered, the selected PLMN may be saved to the listing 58 by accessing menu 72 in a known manner and selecting item 86 entitled "Save" (which item was added to menu 72 because listing 58 is no longer empty; compare FIG. 7) as shown in FIG. 12. As seen in FIG. 13, when saved, the selected PLMN appears in listing 58. When all the desired PLMNs have been added to and prioritized in the listing 58, listing 58 may be saved to the SIM card forming part of communications subsystem 45 by accessing menu 60 in a known manner and selecting item 88 entitled "Save" (which item was added to menu 60 because listing 58 is no longer empty; compare FIG. 5) as seen in FIG. 14. Note that, for illustrative purposes, FIG. 14 assumes that additional PLMNs have been added to the listing 58, and thus the listing 58 shown in FIG. 14 includes additional PLMNs not shown in FIG. 13. Once the listing 58 is saved to the SIM card, it, and not the pre-stored list described above, is used to determine which and in what order PLMNs are to be used by handheld electronic device 4, if available, in roaming situations. In other words, listing 58 overrides the pre-stored list of PLMNs provided with the SIM card.

Figure 15:
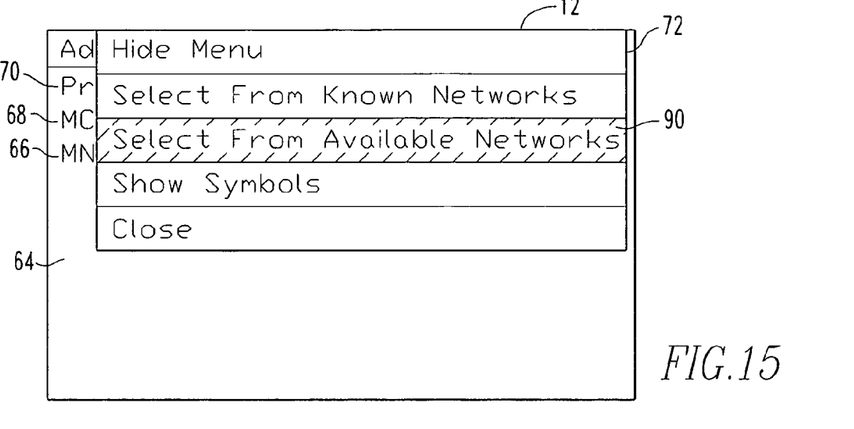
Figure 16:
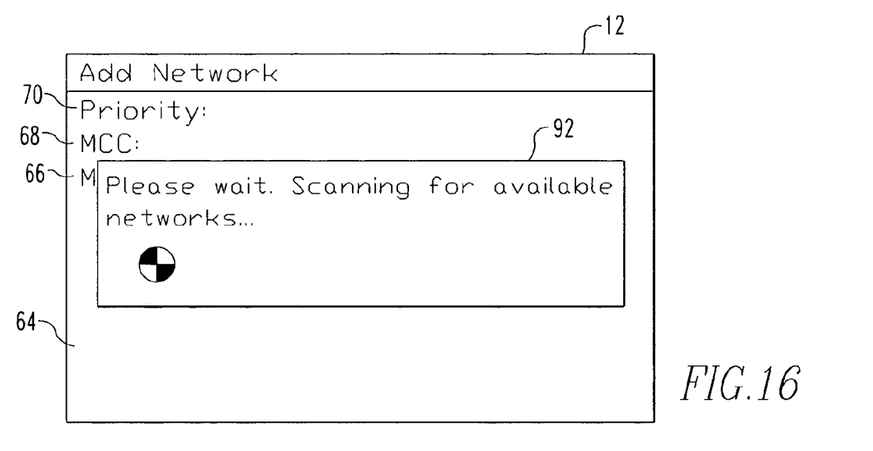
Figure 17:
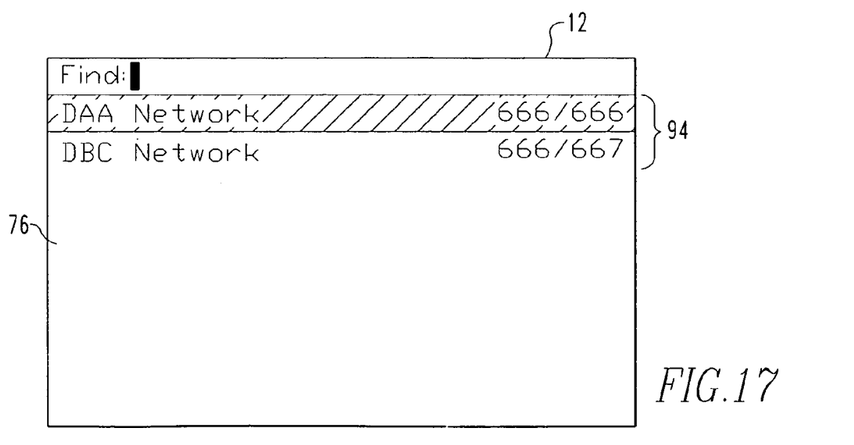

In the third option, the user can add a PLMN to the listing 58 by selecting the PLMN from a group of "available networks," which handheld electronic device 4 is able to locate from its current location using communications subsystem 45 and a known network scanning procedure. To do so, the user accesses menu 72 in a known manner and selects item 90 entitled "Select From Available Networks" as shown in FIG. 15. Next, handheld electronic device 4 performs a scan to locate the current "available networks." As seen in FIG. 16, while this is being done, a dialog box 92 is displayed on display 12 to inform the user that the scan is taking place. Once the scan is completed, "Find" screen 76 as seen in FIG. 17 is displayed on display 12 and includes a listing 94 of all of the "available networks" located during the scanning procedure. The user may then select a particular PLMN for inclusion in the listing 58 and save the listing 58 to the SIM card in the manner described in connection with FIGS. 8 through 14 above. In one embodiment, "available networks" will consist of only "known networks" stored by memory 44. Alternatively, any network located during the scan may be a "available network." Again, once the listing 58 is saved to the SIM card, it, and not the pre-stored list provided in the SIM card described above, is used to determine which and in what order PLMNs are to be used by handheld electronic device 4, if available, in roaming situations.

Figure 18:
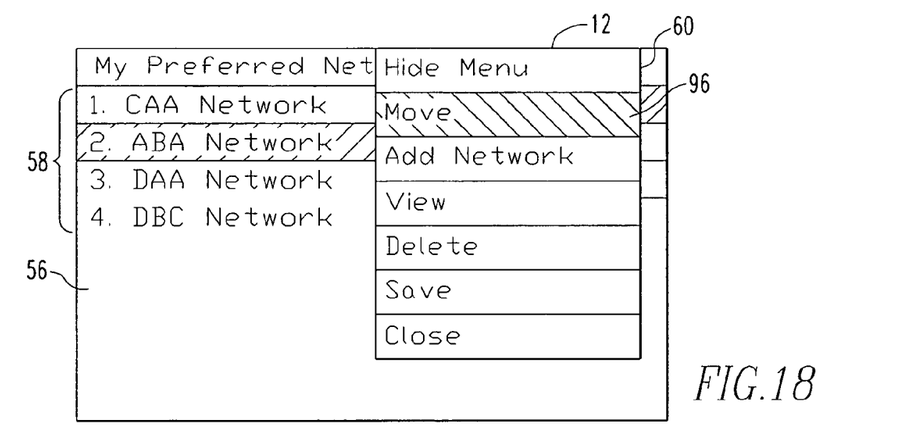
Figure 19:
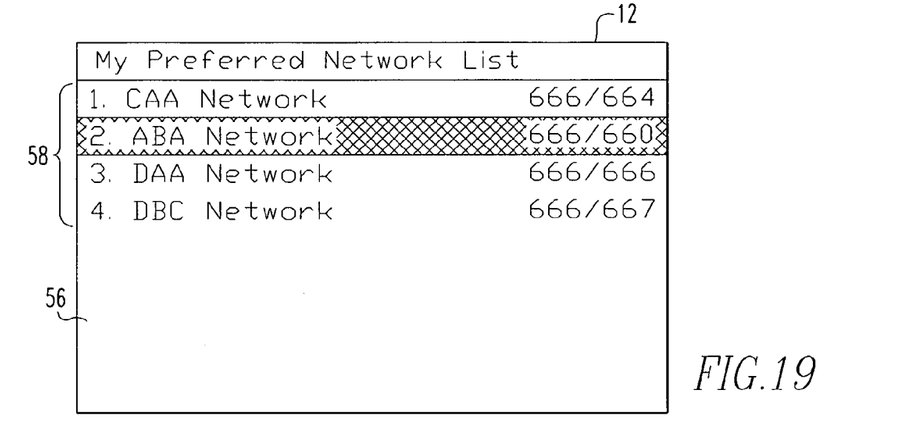
Figure 20:
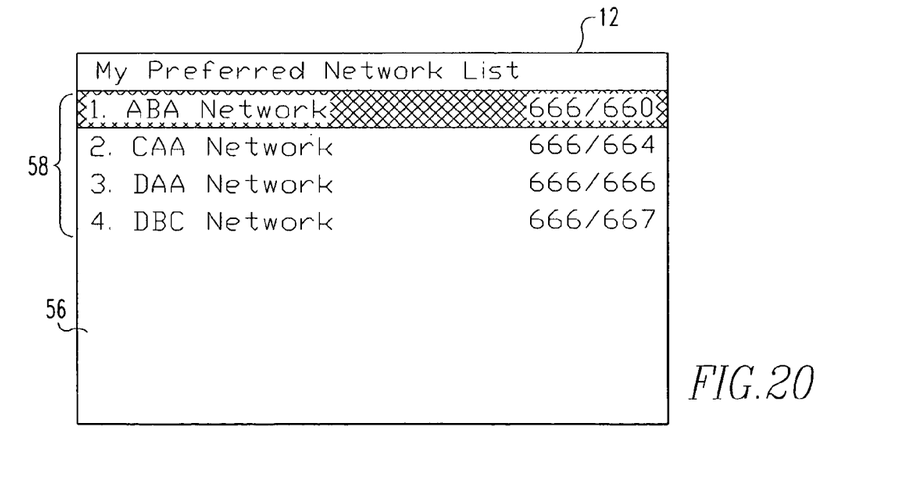

According to an aspect of the invention, the user may easily reorder, and thus change the priority of, the PLMNs listed in listing 58 by selectively moving their location in listing 58. Specifically, according to one embodiment, if a user wants to move a PLMN appearing on listing 58 (for example, the "ABA Network"), the user can, as shown in FIG. 18, identify the PLMN to be moved on "Preferred Network List" screen 56 using the input apparatus in a known manner, access menu 60 therefrom, and select item 96 entitled "Move." When this is done, the identified PLMN is highlighted as shown in FIG. 19. The identified and highlighted PLMN may then be moved to another location on the listing 58 using input apparatus 16, preferably, although not necessarily, by rotating thumbwheel 28 (alternatively, various keys, such as "up" and "down" arrow keys, may be used). Once the identified PLMN is in the desired location on listing 58, its location may be confirmed using input apparatus 16, preferably, although not necessarily, by pressing thumbwheel 28, at which time the moved PLMN will no longer be highlighted. As seen in FIG. 20, once the PLMN is moved, the PLMNs in listing 58 are automatically reordered and renumbered, meaning their assigned priority is changed, if necessary. If desired, the listing 58 as currently appearing in "Preferred Network List" screen 56 may then be saved to the SIM card (with the new assigned priorities) in the manner described in connection with FIGS. 8 through 14. In addition to moving PLMNs listed in listing 58, particular PLMNs may be deleted from listing 58 and/or stored information (the information in fields 66, 68, 70 and 84) for particular PLMNs may be displayed on display 12 by identifying the particular PLMN as described above and then selecting the appropriate item ("Delete" or "View") in menu 60 shown in FIG. 18. When a PLMN is deleted from listing 58, the remaining PLMNs in listing 58 are automatically reordered and renumbered, meaning their assigned priority is changed, if necessary.

Thus, the invention provides a handheld electronic device that enables a user to selectively establish a prioritized list of preferred PLMNs to be used in roaming situations. In this manner, a user is able to select and prioritize particular PLMNs based on issues of PLMN cost, reliability, and service quality, among others, thereby saving the user money and/or enhancing performance of the handheld electronic device.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A wirelessly enabled handheld electronic device, comprising:
   an input apparatus;
   a communications subsystem;
   a display;
   a processor; and
   a memory storing one or more applications executable by said processor, said one or more applications being adapted to:
   display on said display a listing of one or more known networks, each of said known networks having network information stored in said memory;
   scan for one or more available networks using said communications subsystem, each of said available networks being available for use in conducting wireless communications in an area in which said handheld electronic device is currently located, and display on said display a listing of said available networks;
   enable the manual entry of one or more manually entered networks and the manual entry of information relating to the one or more manually entered networks using said input apparatus;
   enable the addition of one or more preferred networks to a preferred network list using said input apparatus, said preferred networks being one or more of: (i) certain of said known networks selected from said listing of known networks, (ii) certain of said available networks selected from said listing of available networks, and (iii) the manually entered networks;
   enable the assignment of a priority value to each of said preferred networks using said input apparatus; and
   utilize one or more of said preferred networks for performing wireless communications using said communications subsystem when said handheld electronic device is in a roaming situation, said one or more of said preferred networks being utilized in a priority order that is based on the priority value assigned to each of said preferred networks.

2. The handheld electronic device according to claim 1, said communications subsystem including a SIM card, said one or more applications being further adapted to store said preferred network list in said SIM card.

3. The handheld electronic device according to claim 2, each of said preferred networks having network information associated therewith, said preferred network list including said network information for each of said preferred networks.

4. The handheld electronic device according to claim 3, said network information including an MNC and an MCC for each of said preferred networks.

5. The handheld electronic device according to claim 1, said one or more applications being further adapted to enable the selection of said certain of said known networks from said listing of known networks and said certain of said available networks from said listing of available networks by selectively scrolling up and down said listing of known networks and said listing of available networks using said input apparatus.

6. The handheld electronic device according to claim 5, said input apparatus including a thumbwheel, said one or more applications being further adapted to enable said scrolling up and down using said thumbwheel.

7. The handheld electronic device according to claim 1, said one or more applications being further adapted to display said preferred network list on said display, said preferred network list being displayed in a display order corresponding to said priority order.

8. The handheld electronic device according to claim 7, said priority value of a first one of said preferred networks being a highest priority, and said priority value of a second one of said preferred networks being a lowest priority, said priority order being sequential beginning with said first one of said preferred networks and ending with said second one of said preferred networks.

9. The handheld electronic device according to claim 7, said one or more applications being further adapted to enable the movement of a selected one of said preferred networks on said display to create an altered display order, said priority value assigned to one or more of said preferred networks being changed such that said priority order corresponds to said altered display order.

10. The handheld electronic device according to claim 9, said input apparatus including a thumbwheel, said one or more applications being further adapted to enable the selection and movement of said selected one of said preferred networks using said thumbwheel.

11. The handheld electronic device according to claim 7, said one or more applications being further adapted to enable the deletion of a selected one of said preferred networks on said display to create an altered display order, said priority value assigned to one or more of said preferred networks being changed such that said priority order corresponds to said altered display order.

12. A method of establishing a prioritized list of networks to be used by a handheld electronic device in roaming situations, comprising:

displaying a listing of one or more known networks upon request of a user of said handheld electronic device, each of said known networks having network information stored by said handheld electronic device;

scanning for one or more available networks upon request of said user, each of said available networks being available for use in conducting wireless communications in an area in which said handheld electronic device is currently located, and displaying a listing of said available networks;

enabling the manual entry of one or more manually entered networks into said handheld electronic device and receiving information relating to said one or more manually entered networks when said information relating to said one or more manually entered networks is manually input into said handheld electronic device by said user;

adding one or more preferred networks to a preferred network list, said preferred networks being one or more of: (i) certain of said known networks selected from said listing of known networks, (ii) certain of said available networks selected from said listing of available networks, and (iii) the manually entered networks; and assigning a priority value to each of said preferred networks;

wherein one or more of said preferred networks are utilized for performing wireless communications when said handheld electronic device is in a roaming situation, said one or more of said preferred networks being utilized in a priority order that is based on the priority value assigned to each of said preferred networks.

13. The method according to claim 12, said handheld electronic device including a SIM card, said method further comprising storing said preferred network list in said SIM card.

14. The method according to claim 12, each of said preferred networks having network information associated therewith, said preferred network list including said network information for each of said preferred networks.

15. The method according to claim 14, said network information including MNC and MCC for each of said preferred networks.

16. The method according to claim 12, further comprising displaying said preferred network list in a display order corresponding to said priority order.

17. The method according to claim 16, said priority value of a first one of said preferred networks being a highest priority, and said priority value of a second one of said preferred networks being a lowest priority, said priority order being sequential beginning with said first one of said preferred networks and ending with said second one of said preferred networks.

18. The method according to claim 16, further comprising displaying said preferred network list on a display, moving a selected one of said preferred networks on said display based on inputs received from said user to create an altered display order, and changing said priority value assigned to one or more of said preferred networks such that said priority order corresponds to said altered display order.

19. The method according to claim 16, further comprising displaying said preferred network list on a display, deleting a selected one of said preferred networks on said display based on inputs received from said user to create an altered display order, and changing said priority value assigned to one or more of said preferred networks such that said priority order corresponds to said altered display order.

* * * * *